US012617983B2

(12) United States Patent
Büteröwe

(10) Patent No.: US 12,617,983 B2
(45) Date of Patent: May 5, 2026

(54) STARCH-BASED AQUEOUS ADHESIVE COMPOSITION

(71) Applicant: BOSTIK SA, Colombes (FR)

(72) Inventor: Frank Büteröwe, Borgholzhausen (DE)

(73) Assignee: BOSTIK SA, Colombes (FR)

( * ) Notice: Subject to any disclaimer, the term of this patent is extended or adjusted under 35 U.S.C. 154(b) by 76 days.

(21) Appl. No.: 18/248,647

(22) PCT Filed: Oct. 11, 2021

(86) PCT No.: PCT/EP2021/078003
§ 371 (c)(1),
(2) Date: Apr. 11, 2023

(87) PCT Pub. No.: WO2022/078934
PCT Pub. Date: Apr. 21, 2022

(65) Prior Publication Data
US 2024/0026190 A1      Jan. 25, 2024

(30) Foreign Application Priority Data

Oct. 12, 2020      (EP) ..................................... 20306198

(51) Int. Cl.
*C09J 103/02*        (2006.01)
*C09J 11/04*        (2006.01)

(52) U.S. Cl.
CPC ............. *C09J 103/02* (2013.01); *C09J 11/04* (2013.01); *C09J 2301/312* (2020.08); *C09J 2301/408* (2020.08)

(58) Field of Classification Search
None
See application file for complete search history.

(56) References Cited

U.S. PATENT DOCUMENTS

| 10,526,514 | B2 * | 1/2020 | Buwalda | B32B 7/12 |
| 2003/0007984 | A1 * | 1/2003 | Euverink | B01J 13/0065 |
| | | | | 435/97 |

| 2014/0008019 | A1 | 1/2014 | Van Delden et al. |
| 2017/0114501 | A1 * | 4/2017 | Wang | D21H 21/16 |
| 2017/0204305 | A1 | 7/2017 | Houillot et al. |

FOREIGN PATENT DOCUMENTS

| CN | 108411696 | A | 8/2018 | |
| EP | 2433995 | A1 * | 3/2012 | C09J 103/12 |
| EP | 3272825 | A1 | 1/2018 | |
| JP | 2000355683 | A | 12/2000 | |
| JP | 2017526768 | A | 9/2017 | |
| WO | 2009101215 | A1 | 8/2009 | |
| WO | 2010015554 | A1 | 2/2010 | |
| WO | 2014200344 | A1 | 12/2014 | |
| WO | 2017183968 | A1 | 10/2017 | |

OTHER PUBLICATIONS

Apparent Amylose Determination in Wild and Cultivated Potatoes, Fajardo et al., Plant Breeding Conferences Proceedings, https://www.ars.usda.gov/research/publications/publication/?seqNo115=243290, Fajardo et al. (Year: 2009).*

Hansen, M.R., et al., "Enzyme modification of starch with amylomaltase results in increasing gel melting point", Carbohydrate Polymers, Aug. 4, 2009, pp. 72-79, vol. 78, No. 1.

Song, Delong, et al., "Rheological study of self-crosslinking and co-crosslinking of ammonium zirconium carbonate and starch in aqueous solutions", Journal of Applied Polymer Science, May 20, 2011, pp. 1019-1029, vol. 122, No. 2.

Batey, Ian, et al., "Measurement of amylose/amylopectin ratio by high performance liquid chromatography", Starch/Starke, 1996, pp. 338-344, vol. 48, No. 9.

ISA/EP; International Search Report and Written Opinion for International Patent Application No. PCT/EP2021/078003 dated Jan. 25, 2022, 9 pages.

* cited by examiner

*Primary Examiner* — Barbara J Musser

(74) *Attorney, Agent, or Firm* — Rimon P.C.; Allyn B. Elliott

(57)        ABSTRACT

The present invention relates to an aqueous adhesive composition comprising: —a) an amylomaltase-treated starch or an amylomaltase-treated maltodextrin; and —b) ammonium zirconium carbonate.

14 Claims, No Drawings

STARCH-BASED AQUEOUS ADHESIVE COMPOSITION

CROSS-REFERENCE TO RELATED APPLICATIONS

This application is a U.S. National Stage application of International Patent Application No. PCT/EP2021/078003, filed on Oct. 11, 2021, which claims the benefit of European Patent Application No. 20306198.1, filed on Oct. 12, 2020.

The present invention relates to starch-based aqueous adhesive composition.

The present invention also relates to the uses of the starch-based aqueous composition for the manufacture of tubes/cores.

BACKGROUND

Homopolymeric polyvinyl acetate (PVAc) dispersions are widely used and have been established for many years in the industrial bonding of paper, wood or paperboard, for example in the field of rigid packaging or fabrication of cores/tubes.

Paperboard or paper cores are hollow tubes made of one or several layers of paperboard or paper. These cores are formed by winding a material such as paper or paperboard, onto a cylindrical mandrel at a given wind angle, the material being wound such that each winding at least partially overlaps the previous winding and is adhered to itself at the seam or overlap to create a cylindrical core. Such cores are commonly used for rolled products where the rolled products are wound around the cores. Mention can be made of cores for paper towel, for toilet paper, or for protecting alcohol bottle.

These cores/tubes are typically manufactured with industrial continuous processes, in particular by core-winding processes. In order to meet the constraints of the high-speed continuous processes used in the industry, the water-based adhesive compositions are expected to have a fast setting time, in other terms to have the ability, immediately after their application and formation of a two substrates assembly, to set a bond rapidly and to maintain this bond after a short application of pressure.

The PVAc dispersions typically allow reaching fast setting times. However, there exists a need for more environmentally dispersions.

Such alternatives exist which are aqueous solutions of dextrin or starch. However, these solutions do not allow obtaining fast setting times, and thus leads to poorer productivity of the industrial processes.

Thus there exists a need for new environmentally adhesive compositions which exhibits fast setting times.

In particular, there exists a need for new environmentally adhesive compositions which provide a good compromise between adhesive properties and fast setting times, notably for the assembling of paper or paperboard substrates.

DESCRIPTION OF THE INVENTION

The present invention concerns an aqueous adhesive composition comprising:
  a) an amylomaltase-treated starch or an amylomaltase-treated maltodextrin; and
  b) ammonium zirconium carbonate (AZC).

The amylomaltase-treated starch may be obtained from native starch comprising from 15% to 30% by weight of amylose and from 70 to 85% by weight of amylopectin, the weight percent being based on the total weight of the native starch.

The content of amylose may be determined by the "blue value" method described in Batey Ian et al., "Measurement of amylose/amylopectin ratio by high performance liquid chromatography", volume 48, n° 9, p. 338-344, 1996.

Maltodextrins are known to be enzymatic derivatives of native starchs. Enzymatic processes for obtaining maltodextrins from native starchs are well known by the skilled person.

Maltodextrin are typically classified by "Dextrose Equivalent" (called DE) which gives an indication of the average degree of polymerization for starch sugars. Typically, maltodextrins have a Dextrose Equivalent as follows:

$$0 < DE \text{ (maltodextrins)} < 20$$

while native starchs have a Dextrose Equivalent of zero.

The Dextrose Equivalent may be measured according to the norm NF EN ISO 5377 (1994).

The amylomaltase-treated maltodextrin may be obtained from a low DE maltodextrin having a Dextrose Equivalent (DE) lower than 10 ($0 < DE < 10$), and more preferably lower than 5 ($0 < DE < 5$).

The low DE maltodextrin having a Dextrose Equivalent (DE) lower than 10, more preferably lower than 5, may be derived from native starch, preferably from waxy native starch containing more than 95% by weight of amylopectin, the weight percent based on the total weight of the native starch.

The native starch may be selected from the group consisting of potato starch, wheat starch, maize starch, rice starch, peas starch, tapioca starch, wrinkled pea starch, mung bean starch, and mixtures thereof. Preferably, the native starch is potato starch.

The low DE maltodextrin having a Dextrose Equivalent (DE) lower than 10 ($0 < DE < 10$), and more preferably lower than 5 ($0 < DE < 5$), may be obtained after treatment of native starch selected from the group of waxy starches, such as potato starch or waxy corn, after treatment with amylolytic enzymes such as amylases.

The aqueous adhesive composition may comprise from 20% to 60%, preferably from 25% to 55%, and even more preferably from 30% to 50% by weight (expressed as dry content) of the amylomaltase-treated starch or the amylomaltase-treated maltodextrin compared to the total weight of the aqueous adhesive composition.

The amylomaltase-treated starch may be obtained according to the process disclosed in EP0932444. An amylose containing starch may be converted by an alpha-1-4, alpha 1-4, glucano transferase (amylomaltase EC 2.4.1.25) to a chain elongated amylopectin. The typical and relevant activity of the amylomaltase is that the enzyme breaks an alpha-1,4 bond. This amylomaltase does not degrade the starch, but reattaches the amylose onto the amylopectin. In the end the amylose is reattached to the amylopectin resulting in the desired product. The product may form thermoreversible gels in low concentrations in water.

For example, the amylomaltase-treated starch can be prepared from suspension of potato starch in water (19-20% w/w). This suspension may be jet-cooked at 150-160° C. in order to dissolve the starch. The product is cooled in vacuum to 70° C., then the pH may be adjusted to 6.2 using for example 6N $H_2SO_4$. Then, amylomaltase (2 ATU/g starch) may be added. The solution may be stirred for 2 to 20 h at 70° C. Then the solution may be jet cooked at 130° C. for a short time, and spray dried using for example a model Compact spray dryer (Anhydro, Danmark).

According to the invention, the amylomaltase-treated starch is a starch that is at least treated with an amylomaltase. In case amylomaltase-treated is not mentioned in connection to the starch, the starch may be native starch but is not amylomaltase-treated.

According to the invention, the amylomaltase-treated maltodextrin is a maltodextrin that is at least treated with an amylomaltase. In case amylomaltase-treated is not mentioned in connection to the maltodextrin, the maltodextrin is not amylomaltase-treated.

Example of suitable amylomaltase-treated starch are the ETENIA™ starches from AVEBE, such as for example ETENIA™ 271.

The aqueous adhesive composition may comprise more than 40% by weight of water, preferably more than 45% by weight of water, even more preferably more than 50% by weight of water compared to the total weight of said aqueous composition.

The aqueous adhesive composition may comprise from 0.10% to 1%, preferably from 0.20% to 0.80% by weight of ammonium zirconium carbonate (dry matter) compared to the total weight of the aqueous adhesive composition.

The ammonium zirconium carbonate may be introduced into the aqueous adhesive composition as an aqueous solution. Aqueous solution of ammonium zirconium carbonate are for example commercialized by Polycoating under the trade name Vernetzer AZC, or by Brenntag under the trade name Zirlink. The content of ammonium zirconium carbonate in the aqueous solution, expressed as $ZrO_2$, may range from 15% to 25% by weight, preferably from 18% to 22%, based to the total weight of the aqueous solution.

The aqueous adhesive composition may comprise at least one additive selected from the group consisting of biocide, defoamer, plasticizer, rheology modifier, coloring agent, wetting agent, pH regulator, inorganic filler, and mixtures thereof.

The total content of additive(s) may range from 0.1% to 1% by weight compared to the total weight of the aqueous adhesive composition.

In a preferred embodiment, the aqueous adhesive composition is free of boron compounds such as for example boric acid or borax. Borax and boric acid are known to be toxic and not environmentally friendly, thus it is preferably to avoid the use of such components into the aqueous adhesive composition.

The aqueous adhesive composition may have a viscosity ranging from 100 mPa·s. to 5 000 mPa·s, preferably from 300 mPa·s. to 1 000 mPa·s at 23° C. The viscosity is measured with a Brookfield RVT viscometer.

The aqueous adhesive composition may have a pH ranging from 7 to 10, and more preferably from 8 to 9 at 23° C.

The present invention also concerns the method of preparation of the aqueous adhesive composition as disclosed above.

The aqueous adhesive composition may be prepared by mixing the a) amylomaltase-treated starch or the amylomaltase-treated maltodextrin with the b) ammonium zirconium carbonate, and optional additives, with water. The mixing may be implemented at 23° C.

The present invention also relates to the use of the aqueous adhesive composition as disclosed above for the manufacture of rigid packaging or tubes.

In one embodiment, the aqueous adhesive composition according to the invention is used for the manufacture of tubes/cores by corewinding. These tubes can be for example used for the manufacture of paper towel, toilet paper, or protection of alcohol bottle. Preferably, the tubes/cores are made of paper or paperboard.

According to the present invention, by «comprised between x and y», or «ranging from x to y», it is meant a range wherein limits x and y are included. For example, the range "comprising between 1% and 3%" includes in particular 1% and 3%.

Experimental Part

Viscosity

The viscosity of the composition was determined with a Brookfield DV-I digital Viscometer (mPa·s) with the correct applicable spindle (for example spindle 2) at 20 RPM, 23° C. (±1° C.) after 15 s.

pH Value

Determination of pH value with pH/temperature meter TESTO 230 at 23° C. (±1° C.) after calibration of electrode pH 7 and 10 with a buffer solution.

Adhesion Setting Time

The setting time of the aqueous adhesive composition is determined with a FIPAGO adhesion tester (System PKL) in a conditioned room (RH=50±5%, T=23° C.±2° C.).

Sample preparation: before the test, the adhesive stands at least for 24 h in a controlled room at RH=50±5%, T=23° C.±2° C. The following strips from Fipago 2006 papers (Stohlein company, 200 g/m2, Cobb 1800: 86 g/m2) were cut:

30×200 mm paper strips where the adhesive aqueous composition will be applied

60×100 mm paper strips that will be put in FIPAGO adhesion tester.

A thin film of the aqueous adhesive composition is applied on the 30×200 paper strips with roll coating machine at 55 g/sqm (±5 g/sqm)=0.31-0.35 g aqueous adhesive composition per strip. The paper strip 60×100 mm is immobilized, on a horizontal plane, on a grade of the measure machine which is linked to a mobile arm capable of performing a pendulum movement around a pivot. An extremity of the 30×200 paper strip is (on about 2 cm of length) put into contact, by its side coated with the aqueous adhesive composition, with a fixed bearing linked to the machine, which is co-planar and adjacent to the precedent one. The biggest part of the 30×200 paper strip is then coated to the 60×100 paper strip and pressed uniformly on that last automatically, via the pressing device of the machine. This pressing is carried out 5 s after coating of the strip (open time). The adhesive assembly is then broken by the trigger of a pendulum movement of the mobile arm leading to the separation of the two substrates.

The setting time is the minimum time to exceed an energy of 70 mmKp (0.69 J) with an open time of 5 s.

Example 1: Preparation of the Aqueous Adhesive Composition C1

The following ingredients were used for the preparation of the aqueous adhesive composition:

ETENIA™ 271: amylomaltase-treated starch commercialized by AVEBE NL,

VERNETZER® AZC: ammonium zirconium carbonate (AZC) solution commercialized by POLYCOATING GmbH having 20% of AZC expressed as $ZrO_2$;

AGITAN® 301 (defoamer): Blend of vegetable oils, modified fatty compounds, nonionic emulsifiers with a little silicone commercialized by MUNZING CHEMIE ABSTATT;

ACTICIDE® MBS (biocide): Mixture of 1,2-Benzisothiazolin-3-one (BIT) and 2-Methyl-4-isothiazolin-3-one (MIT) commercialized by THOR.

The following composition was prepared as follows, with the ingredients and quantities mentioned in table below: 40 g of ETENIA™ 271 was slowly dispersed in 58.7 ml of water, and homogenized until obtaining a clear appearance (time: 1 h). AZC was added, and the mixture was mixed for 15 min at a temperature of 23° C. The 0.2 g of ACTICIDE® MBS (biocide) and 0.1 g of AGITAN 301® (defoamer) were then added as well, and the mixture was stirred at 23° C. for 1 h. The viscosity was measured and additional water was added to reach a viscosity of 500 mPa·s at 23° C.

TABLE 1

| adhesive aqueous composition C1 | |
| --- | --- |
| Product name | Weight percent in the composition (compared to the total weight composition) |
| ETENIA ™ 271 | 40 |
| VERNETZER ® AZC | 1 |
| AGITAN ® 301 | 0.10 |
| ACTICIDE ® MBS | 0.20 |
| water | 58.70 |
| total | 100 |
| pH | 9 |
| Viscosity (mPa · s at 23° C.) | 500 |
| Setting time (s) | 29 |

The table 1 shows that the aqueous adhesive composition according to the invention (C1) advantageously exhibits a setting time of 29 s. This short setting time advantageously allows to improve the speed production line, and thus to improve the productivity.

The invention claimed is:

1. Aqueous adhesive composition comprising:
   a) from 20% to 60% by weight of an amylomaltase-treated starch or an amylomaltase-treated maltodextrin, compared to a total weight of the aqueous adhesive composition, wherein the amylomaltase-treated starch is obtained from native starch comprising from 15% to 30% by weight of amylose and from 70% to 85% by weight of amylopectin, the weight percent being based on the total weight of the native starch; and
   b) ammonium zirconium carbonate.

2. Aqueous adhesive composition according to claim 1, wherein the native starch is selected from the group consisting of potato starch, wheat starch, maize starch, rice starch, peas starch, tapioca starch, wrinkled pea starch, mung bean starch, and mixtures thereof.

3. Aqueous adhesive composition according to claim 1, wherein the native starch is potato starch.

4. Aqueous adhesive composition according to claim 1, comprising more than 40% by weight of water, compared to the total weight of said aqueous composition.

5. Aqueous adhesive composition according to claim 1, comprising from 0.10% to 1.0% by weight, of ammonium zirconium carbonate (dry matter) compared to the total weight of the aqueous adhesive composition.

6. Aqueous adhesive composition according to claim 1, comprising at least one additive selected from the group consisting of biocide, defoamer, plasticizer, rheology modifier, coloring agent, wetting agent, pH regulator, inorganic filler, and mixtures thereof.

7. Aqueous adhesive composition according to claim 1, characterized in that it is free of boron compounds.

8. Aqueous adhesive composition comprising:
   a) from 20% to 60% by weight of an amylomaltase-treated starch or an amylomaltase-treated maltodextrin, compared to a total weight of the aqueous adhesive composition; and
   b) ammonium zirconium carbonate, wherein the amylomaltase-treated maltodextrin is obtained from low DE maltodextrin having a Dextrose Equivalent (DE) lower than 10 (0 <DE <10).

9. Aqueous adhesive composition according to claim 8, wherein the low DE maltodextrin has a dextrose equivalent lower than 5 (0 <DE <5).

10. Aqueous adhesive composition comprising:
    a) from 20% to 60% by weight of an amylomaltase-treated starch or an amylomaltase-treated maltodextrin, compared to a total weight of the aqueous adhesive composition; and
    b) ammonium zirconium carbonate, wherein the aqueous adhesive composition has a viscosity ranging from 100 mPa.s. to 5,000 mPa.s at 23° C.

11. Aqueous adhesive composition according to claim 10, having a pH ranging from 7 to 10.

12. Rigid packaging or tubes comprising the aqueous adhesive composition according to claim 10.

13. A method of manufacturing a rigid cylindrical core comprising winding a paper or paperboard material onto a cylindrical mandrel at a given wind angle, wherein the material is wound such that each winding at least partially overlaps a previous winding, applying the aqueous adhesive composition according to claim 10 to a seam or an overlapping portion of the material such that the paperboard or paper material adheres to itself at the seam or overlapping portion thereby creating a rigid cylindrical core.

14. The method of claim 13, wherein the rigid cylindrical core comprises a paper towel core, a toilet paper core, or a core for protection of alcohol bottle.

* * * * *